US012657079B2

(12) United States Patent
Salobrena Garcia et al.

(10) Patent No.: US 12,657,079 B2
(45) Date of Patent: Jun. 16, 2026

(54) INDICATING DATA CORRUPTION

(71) Applicant: Micron Technology, Inc., Boise, ID (US)

(72) Inventors: Casto Salobrena Garcia, Munich (DE); Marcos Alvarez Gonzalez, Munich (DE); Michael Dieter Richter, Ottobrunn (DE); Thomas Hein, Munich (DE); Ronny Schneider, Höhenkirchen-Siegertsbrunn (DE)

(73) Assignee: Micron Technology, Inc., Bosie, ID (US)

(*) Notice: Subject to any disclaimer, the term of this patent is extended or adjusted under 35 U.S.C. 154(b) by 24 days.

(21) Appl. No.: 18/774,452

(22) Filed: Jul. 16, 2024

(65) Prior Publication Data

US 2025/0117273 A1    Apr. 10, 2025

Related U.S. Application Data

(60) Provisional application No. 63/587,938, filed on Oct. 4, 2023.

(51) Int. Cl.
G06F 11/07        (2006.01)
(52) U.S. Cl.
CPC ...... G06F 11/0751 (2013.01); G06F 11/0793 (2013.01)

(58) Field of Classification Search
CPC ............ G06F 11/0751; G06F 11/0793; G06F 11/1048; G06F 11/1004; G06F 11/10
See application file for complete search history.

(56) References Cited

U.S. PATENT DOCUMENTS

2019/0065237 A1* 2/2019 Lee ......................... G06F 9/466

* cited by examiner

*Primary Examiner* — Thien Nguyen
(74) *Attorney, Agent, or Firm* — Holland & Hart LLP

(57) ABSTRACT

Methods, systems, and devices for indicating data corruption are described. A memory system may be configured to identify and store corrupted data received from a host system without storing metadata. As part of transmitting a bulk transmission, the host system may transmit first data to be stored at an address of the memory system, and a first indication identifying that the first data is corrupted. The memory system may generate second data with a pattern of bits indicating that data stored at the address of the memory system is corrupted. The memory system may store the second data to the address, and later retrieve the second data in response to receiving a read command from the host system. Then, the memory system may generate a second indication identifying that the second data is corrupted, and transmit the second data and the second indication to the host system.

25 Claims, 4 Drawing Sheets

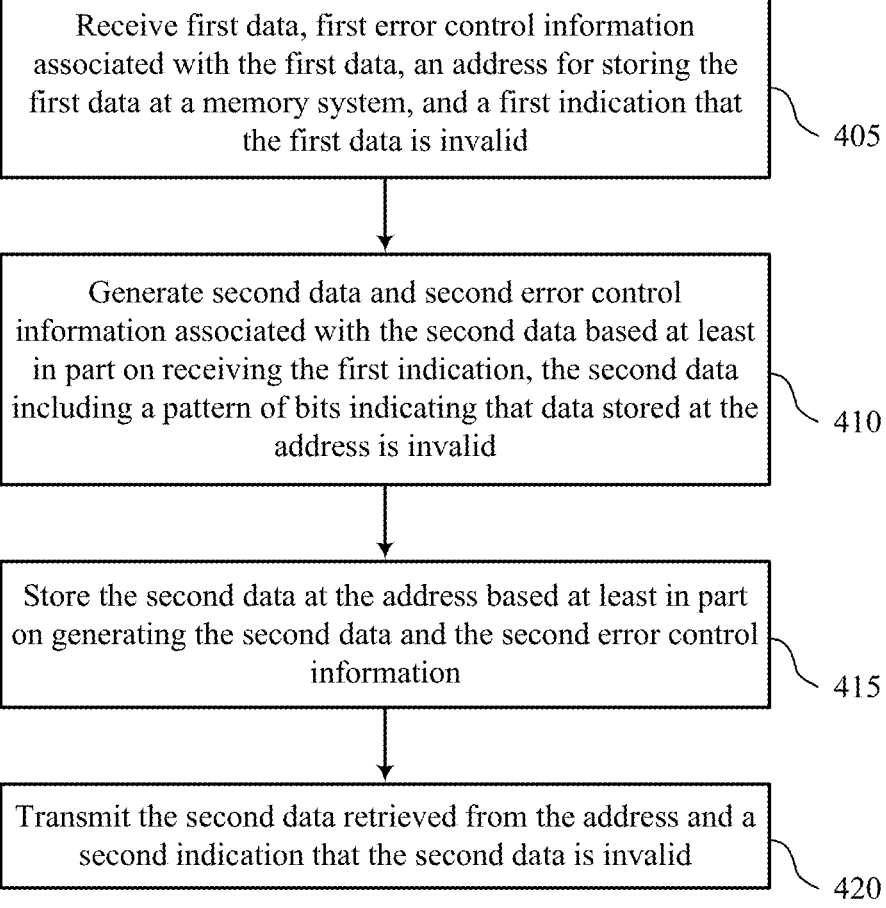

Receive first data, first error control information associated with the first data, an address for storing the first data at a memory system, and a first indication that the first data is invalid

405

Generate second data and second error control information associated with the second data based at least in part on receiving the first indication, the second data including a pattern of bits indicating that data stored at the address is invalid

410

Store the second data at the address based at least in part on generating the second data and the second error control information

415

Transmit the second data retrieved from the address and a second indication that the second data is invalid

INDICATING DATA CORRUPTION

CROSS REFERENCE

The present Application for Patent claims priority to U.S. Patent Application No. 63/587,938 by Garcia et al., entitled "INDICATING DATA CORRUPTION," filed Oct. 4, 2023, which is assigned to the assignee hereof, and which is expressly incorporated by reference in its entirety herein.

TECHNICAL FIELD

The following relates to one or more systems for memory, including indicating data corruption.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

BRIEF DESCRIPTION OF THE DRAWINGS

FIG. 4 shows a flowchart illustrating a method or methods that support indicating data corruption in accordance with examples as disclosed herein.

DETAILED DESCRIPTION

Figure 1:
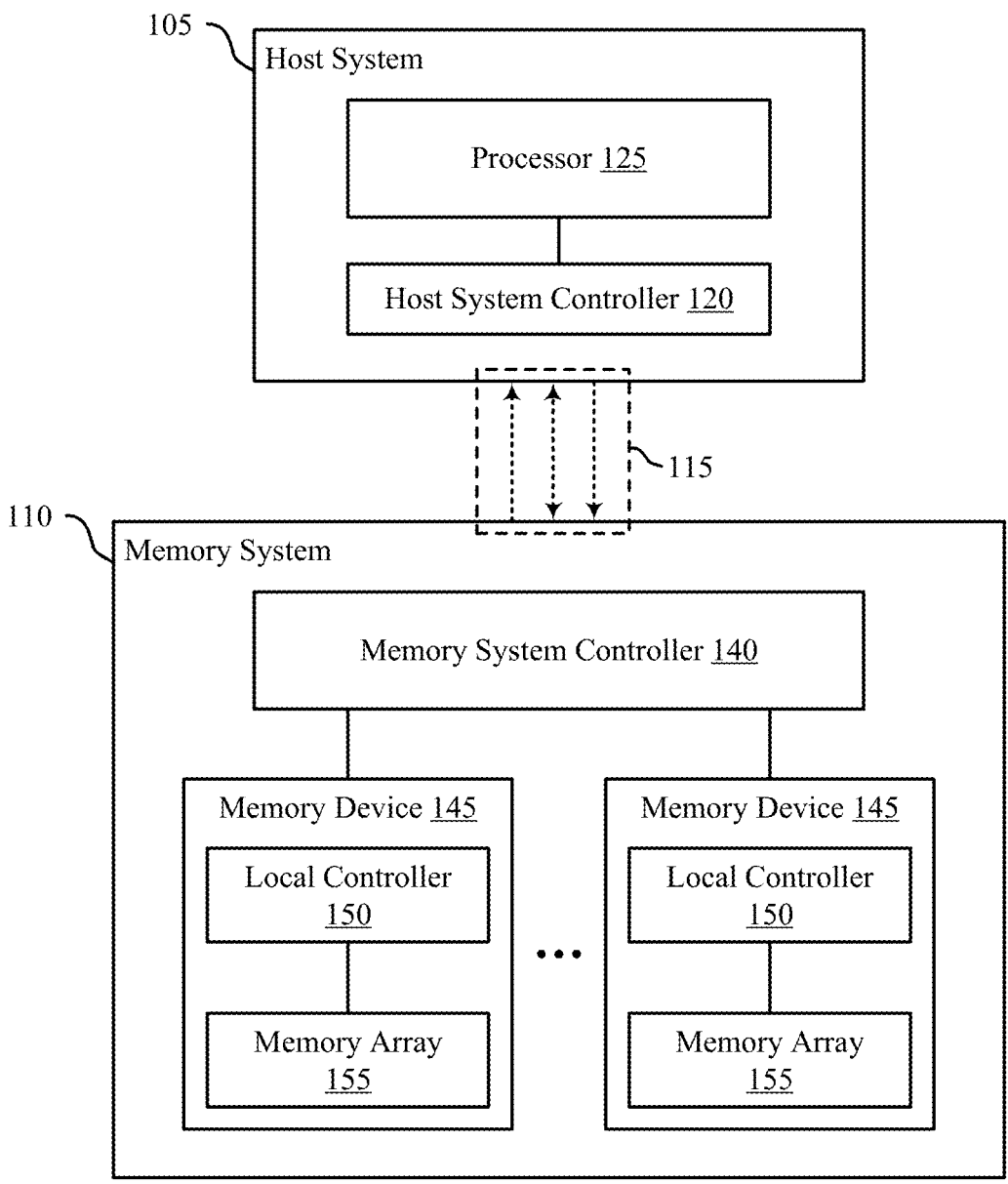
FIG. 1 shows an example of a system that supports indicating data corruption in accordance with examples as disclosed herein.

In some cases, a host system may store corrupted (e.g., invalid, poisoned) data in a memory system. For example, the host system may transfer data (e.g., valid data) and corrupted data to the memory system in a bulk transmission (e.g., from a cache) for storing in a memory array of the memory system. In some such examples, the host system may also transmit metadata identifying that a portion of the data in the bulk transmission is invalid (e.g., the corrupted data), such that the metadata may distinguish the valid data from the invalid data in the bulk transmission. However, reading the metadata to determine whether selected data (e.g., data subject to a read operation) is corrupted may be associated with relatively high latency and high bandwidth usage for the memory system (e.g., a memory system controller of the memory system). In some cases, the memory system may store the metadata with the bulk transmission in the memory array. In some such cases, however, the metadata may be associated with occupying a relatively large portion of the memory array, thereby decreasing available space in the memory array for storing other data.

In accordance with examples as described herein, a memory system may be configured to identify and store corrupted data received from a host system without using metadata. In some cases, the host system may transmit a bulk transmission (e.g., from a cache) and one or more indications (e.g., poison flags) corresponding to corrupted data included in the bulk transmission. For example, as part of transmitting the bulk transmission, the host system may transmit first data (e.g., first data and first error control information) to be stored at an address of the memory system, and a first indication identifying that the first data is corrupted. The memory system may generate second data (e.g., second data and second error control information) with a pattern of bits indicating that data stored at the address of the memory system is corrupted. For example, the pattern of bits may be bits of a same logic value or bits that will fail to correct during an error control operation performed on the second data. The memory system may store the second data to the address, and later retrieve the second data in response to receiving a read command (e.g., for the address) from the host system. Then, the memory system may generate a second indication identifying that the second data is corrupted, and transmit the second data and the second indication to the host system. The techniques described herein may prevent the memory system from storing metadata otherwise associated with identifying corrupted data, thereby increasing available storage space of the memory system. Similarly, using the indications for distinguishing corrupted data may be associated with relatively lower latency and bandwidth for the memory system.

Features of the disclosure are illustrated and described in the context of systems and architectures. Features of the disclosure are further illustrated and described in the context of process flows, block diagrams, and flowcharts.

FIG. 1 illustrates an example of a system 100 that supports indicating data corruption in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

In some cases, the host system 105 may include a cache configured to temporarily store information. For example, the cache may store information related to one or more applications or processes that are being executed by the host system. In some such examples, the information may include data, metadata, and/or error control information. In some implementations, the cache may also store one or more indications (e.g., flags) distinguishing corrupted data (e.g., invalid data, poisoned data) and data (e.g., valid data) within the cache. For example, the cache may store a table indicating which data in the cache is corrupted (e.g., invalid).

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A command/address channel (e.g., a CA channel) may be operable to communicate commands between the host system 105 and the memory system 110, including control information associated with the commands (e.g., address information, configuration information). Commands carried by a command/address channel may include a write command with an address for data to be written to the memory system 110 or a read command with an address of data to be read from the memory system 110.

One or more data channels (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error control (e.g., error detection code (EDC)) channels. An error control channel may be operable to communicate error control (e.g., detection) signals, such as checksums or parity bits, which may accompany information conveyed over a data channel. In some cases, the channels 115 may include one or more data channels and one or more error control channels operable to communicate respective information (e.g., data for the one or more data channels, error control information for the one or more error control channels) from the host system 105 to the memory system 110. In some cases, the one or more data channels and the one or more error control channels may be operable to transfer the respective information from the cache of the host system 105 to the memory system 110.

In accordance with examples as described herein, the memory system 110 may be configured to identify and store corrupted data (e.g., invalid data, poisoned data) received from the host system 105 without using metadata. In some cases, the host system 105 may transmit a bulk transmission (e.g., a quantity of data transmissions each including data and corresponding error control information, a quantity of addresses of the memory system 110 for storing the quantity of data transmissions) and one or more indications (e.g., poison flags, signatures) corresponding to corrupted data included in the bulk transmission. For example, as part of transmitting the bulk transmission, the host system 105 may transmit first data (e.g., first data and first error control information) to be stored at an address of the memory array 155, and a first indication distinguishing the first data is corrupted. The memory system 110 (e.g., the memory system controller 140) may generate second data (e.g., second data and second error control information) with a pattern of bits indicating that data stored at the address of the memory array 155 is corrupted. For example, the pattern of bits may be bits of a same logic value or bits that will fail to correct during an error control operation performed on the second data. The memory system 110 may store the second data to the address, and later retrieve the second data in response to receiving a read command (e.g., for the address) from the host system 105. Then, the memory system 110 (e.g., the memory system controller 140) may generate a second indication distinguishing the second data is corrupted and transmit the second data and the second indication to the host system 105. The techniques described herein may make it so that the memory system 110 does not store metadata associated with corrupted data, thereby increasing available storage space of the memory system 110. Similarly, using the indications for distinguishing corrupted data may be associated with relatively lower latency and bandwidth for the memory system 110 (e.g., the memory system controller 140).

In addition to applicability in systems as described herein, techniques for indicating data corruption may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by improving memory access speeds otherwise associated with identifying and storing corrupted data using metadata, which may decrease processing or latency times, among other benefits.

In addition to applicability in systems as described herein, techniques for indicating data corruption may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory devices capable of effectively and efficiently storing relatively large quantities of data or accessing stored data relatively quickly. Implementing the techniques described herein may support artificial intelligence and/or machine learning techniques by preventing accessing and storing metadata for identifying and storing corrupted data, thereby improving memory access speeds and increasing memory capacity or density, among other benefits.

Figure 2:
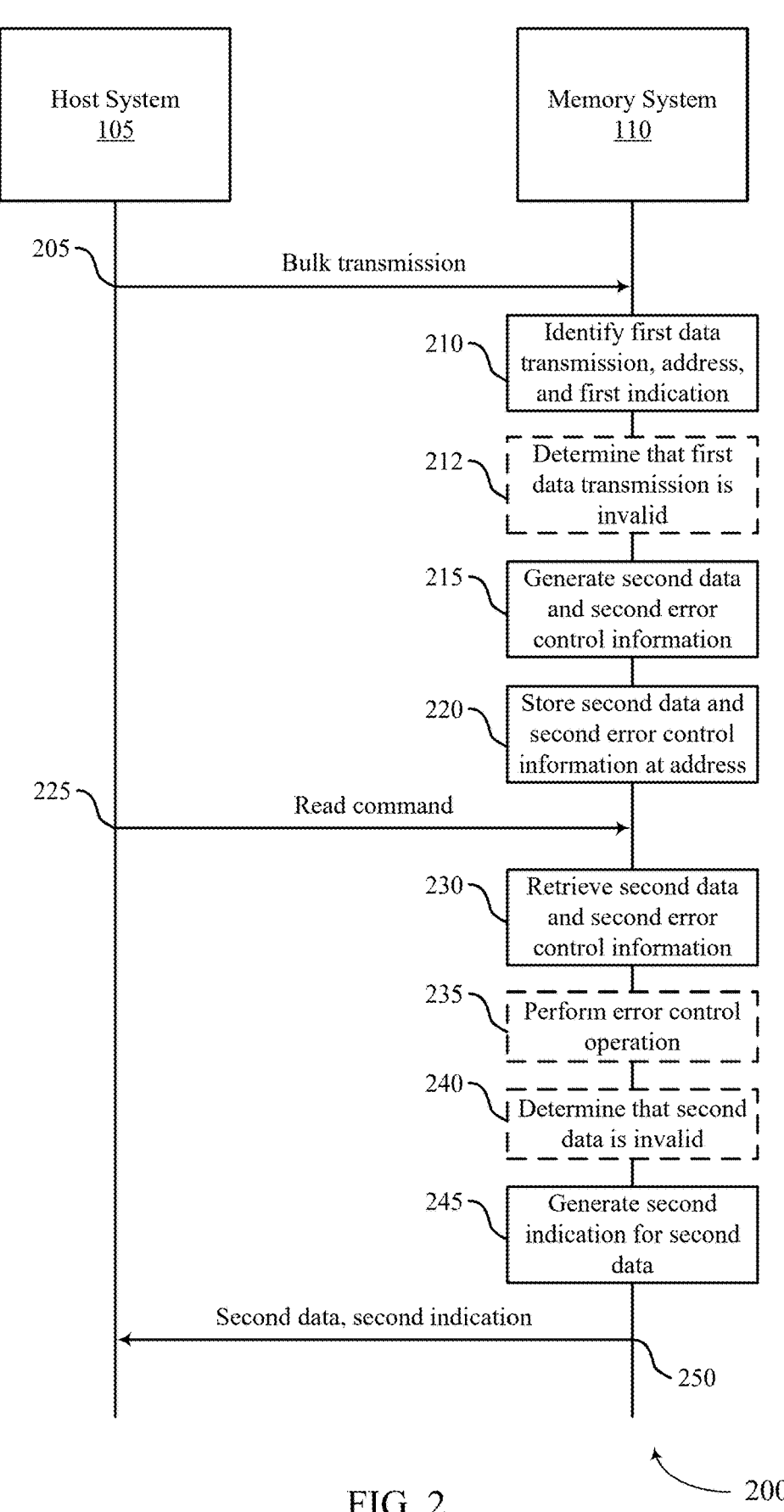
FIG. 2 shows an example of a process flow that supports indicating data corruption in accordance with examples as disclosed herein.

FIG. 2 shows an example of a process flow 200 that supports indicating data corruption in accordance with examples as disclosed herein. The process flow 200 may illustrate aspects or operations of a system, which may be an example of a system 100, as described with reference to FIG. 1. For example, the process flow 200 may be implemented by a host system 105 and a memory system 110, as described with reference to FIG. 1. In the following description of the process flow 200, the methods, techniques, processes, and operations may be performed in different orders or at different times. Further, certain operations may be left out of the process flow 200, or other operations may be added to the process flow 200. Aspect of the process flow 200 illustrated at the host system 105 may be implemented by a processor 125 or a host system controller 120 of the host system 105, as described with reference to FIG. 1. Additionally, or alternatively, aspects of the process flow 200 may be implemented as instructions stored in memory (e.g., firmware). For example, the instructions, if executed by a controller (e.g., the processor 125, the host system controller 120), may cause the controller to perform the operations of the process flow 200. The process flow 200 may depict operations for identifying and storing corrupted data without using metadata.

The memory system 110 may include at least a memory system controller and a memory array. For example, the memory system controller and the memory array may be examples of a memory system controller 140 and a memory array 155, respectively, as described with reference to FIG. 1. The memory system controller may be configured to communicate with the host system 105, such that the memory system controller may perform operations on the memory system 110 in accordance with commands from the host system 105. For example, the memory system controller may perform an access operation (e.g., a read operation, a write operation) based on receiving an access command from the host system 105. In some cases, the memory array may be a volatile memory array (e.g., a DRAM array), such that the memory array may include volatile memory cells (e.g., DRAM cells) each configured to store one or more bits of information. In other cases, the memory array may be a non-volatile memory array (e.g., a NAND memory array), such that the memory array may include non-volatile memory cells (e.g., NAND memory cells) each configured to store the one or more bits of information.

The host system 105 may include a cache configured to store information related to one or more applications or processes that are being executed by the host system 105. For example, the information may include data (e.g., valid data and invalid data), metadata, error control information associated with the data, and/or indications for distinguishing corrupted data (e.g., invalid data, poisoned data). In some cases, the host system 105 may switch applications or processes, or end an application or process, and the host system 105 may be compelled to quickly increase available storage area of the cache so that the host system 105 may begin a new application or process. In some such cases, the host system 105 may transfer the information stored in the cache to the memory system 110 for storage. For example, the host system 105 may perform a cache flush in which the information stored in the cache is transmitted to the memory system 110 at one time. When flushing the cache, the host system 105 may transmit all the information stored in the cache to the memory system 110, such that the information may include data (e.g., valid data) and corrupted data (e.g., invalid data). For example, while the host system 105 is executing an application or process, data stored in the cache may become corrupted (e.g., invalid, poisoned).

In some cases, it may be advantageous (e.g., latency) for the host system 105 to quickly switch from an old application or process to a new application or process. In some such cases, the host system 105 may perform the cache flush to transfer all the information stored in the cache to the memory system 110, rather than sifting through the information and only transferring the valid data. That is, evaluating whether data is valid or invalid may increase latency for switching between the old application or process to executing the new application or process at the host system 105. Thus, the host system 105 may flush the cache and send a bulk transmission to the memory system 110.

At 205, the host system 105 may transmit the bulk transmission to the memory system 110. The bulk transmission may include a quantity of data transmissions each including data, metadata associated with the data, and/or error control information associated with the data. In some cases, the bulk transmission may be transmitted to the memory system 110 as part of the cache flush. In some cases, the host system 105 may transmit the bulk transmission at one time, such that the memory system 110 may receive the quantity of data transmissions, the quantity of addresses, and the one or more indications at least partially concurrently. The error control information included in the bulk transmission may be examples of cyclic redundancy check (CRC) bits, error correction code (ECC) bits, or error detection code (EDC) bits. In some cases, the error control information may be generated by the host system 105 prior to transmitting the bulk transmission to the memory system 110. In such cases, the error control information may be host ECC, which may be different than link ECC or on-die ECC.

The bulk transmission may also include a quantity of addresses of the memory array operable to store the quantity of data transmissions, such that each address may be associated with storing one or more data bits or one or more error control bits, or a combination thereof. The bulk transmission may also include one or more indications (e.g., poison flags, signatures) identifying corrupted data from the quantity of data transmissions. For example, each indication may correspond to a portion of data that has been identified as corrupted data by the host system 105. In some implementations, the one or more indications may be included in a table (e.g., a corrupted data mapping table) transmitted to the cache as part of the bulk transmission. The bulk transmission may also include metadata for the data being transmitted, where the one or more indications may be considered metadata.

At 210, the memory system controller may identify a first data transmission, an address of the memory array for storing the first data transmission, and a first indication from the bulk transmission. The first data transmission may include first data and first error control bits (e.g., ECC bits, first error control information) corresponding to the first data, where the first data and/or the first error control bits are corrupted. Corrupted information (e.g., data or error control bits) may be invalid information, unusable information, poisoned information, or information that includes a quantity of errors that satisfies a threshold. For example, corrupted information may have been data that was unintentionally altered (e.g., while completing one or more applications or processes at the host system 105), such that the resulting data may not be usable (e.g., accessed). The first indication may identify (e.g., distinguish) that the first data transmission is corrupted, such that the first indication may identify that the first data and/or the first error control bits are corrupted. For example, the memory system controller may read the table including the indications to determine which data transmissions are corrupted (e.g., include a quantity of corrupted bits satisfying a threshold), and the memory system controller may determine the first data transmission is corrupted based on identifying the first indication in the table.

At 215, the memory system controller may generate second data and second error control bits (e.g., ECC bits, second error control information) associated with the second data. In some cases, the memory system controller may generate the second data and second error control bits based on identifying that the first data transmission is corrupted. The second data and the second error control bits may be generated to include a pattern of bits. In some cases, the pattern of bits may be bits of a same logic value, such that the pattern of bits may be a quantity of 0's or a quantity of 1's. In other cases, the pattern of bits may be bits that fail to correct the second data during an error control operation. For example, the pattern of bits may prevent the error control operation from correcting (e.g., bit flipping) the second data such that the second data may unintentionally resemble usable data. In some such cases, the pattern of bits may be selected based on error control codes such that the pattern of bits does not correspond to any error control code of the host system 105 or the memory system 110.

At 220, the second data and/or the second error control bits may be stored to the address of the memory array otherwise associated with the first data transmission. For example, memory system controller may transmit the second data and the second error control bits to the memory array and store the second data and the second error control bits to the address initially associated with (e.g., specified to store) the first data transmission, identified at step 210 of the process flow 200. In some cases, the error control information from the bulk transmission and/or the second error control bits, may be stored to a dedicated error control storage area of the memory array.

At 225, the host system 105 may transmit a read command to the memory system 110, such that the memory system controller may receive the read command. The read command may request data stored at the address initially associated with the first data transmission.

At 230, the memory system controller may retrieve the second data and the second error control bits from the memory array. For example, the memory system controller may retrieve the second data and the second error control bits from the address otherwise associated with the first data transmission. In some cases, the memory system controller may temporarily store the second data and the second error control bits in a memory (e.g., a cache, a buffer) of the memory system controller.

At 235, the memory system controller may perform an error control operation to determine whether the second data and the second error control bits are corrupted. In some cases, performing the error control operation may include attempting to correct the second data and the second error control bits. In some cases, the host system 105 may perform the error control operation at a time after step 250 of the process flow 200.

At 240, the memory system controller may determine the second data and the second error control bits are corrupted. For example, the memory system controller may perform the error control operation and determine the second data and the second error control bits are corrupted based on the error control operation failing to correct the second data and the second error control bits. In some such examples, the error control operation may attempt to correct the second data and the second error control bits, however due to the pattern of bits being configured to fail (e.g., fail to correct or bit flip the second data and the second error control bits) the error correction operation, the memory system controller may identify that the second data and the second error control bits are corrupted. In some cases, the host system 105 may determine the second data and the second error control bits are corrupted at a time after step 250 of the process flow 200.

At 245, the memory system controller may generate a second indication that the second data and the second error control bits are corrupted. In some cases, the second indication may indicate that the data stored in the address is corrupted. In some cases, the memory system controller may generate the second indication based on determining that the second data and the second error control bits are corrupted at step 240 of the process flow 200.

At 250, the memory system controller may transmit the second data, the second error control bits, and the second indication to the host system 105. The host system 105 may identify that the second data and the second error control bits are corrupted based on reading the second indication. In some cases, the host system 105 may determine that the data stored in the address is corrupted based on receiving the second indication.

In accordance with examples as described herein, implementing the process flow 200 may enable identifying and storing corrupted data in the memory system 110 without storing metadata in the memory system 110, thereby increasing available storage space of the memory system 110. That is, generating the indications based on read commands may prevent storing metadata otherwise associated with relatively large storage usage. Additionally, using the indications for identifying corrupted data may enable relatively lower latency and bandwidth for the memory system 110.

Figure 3:
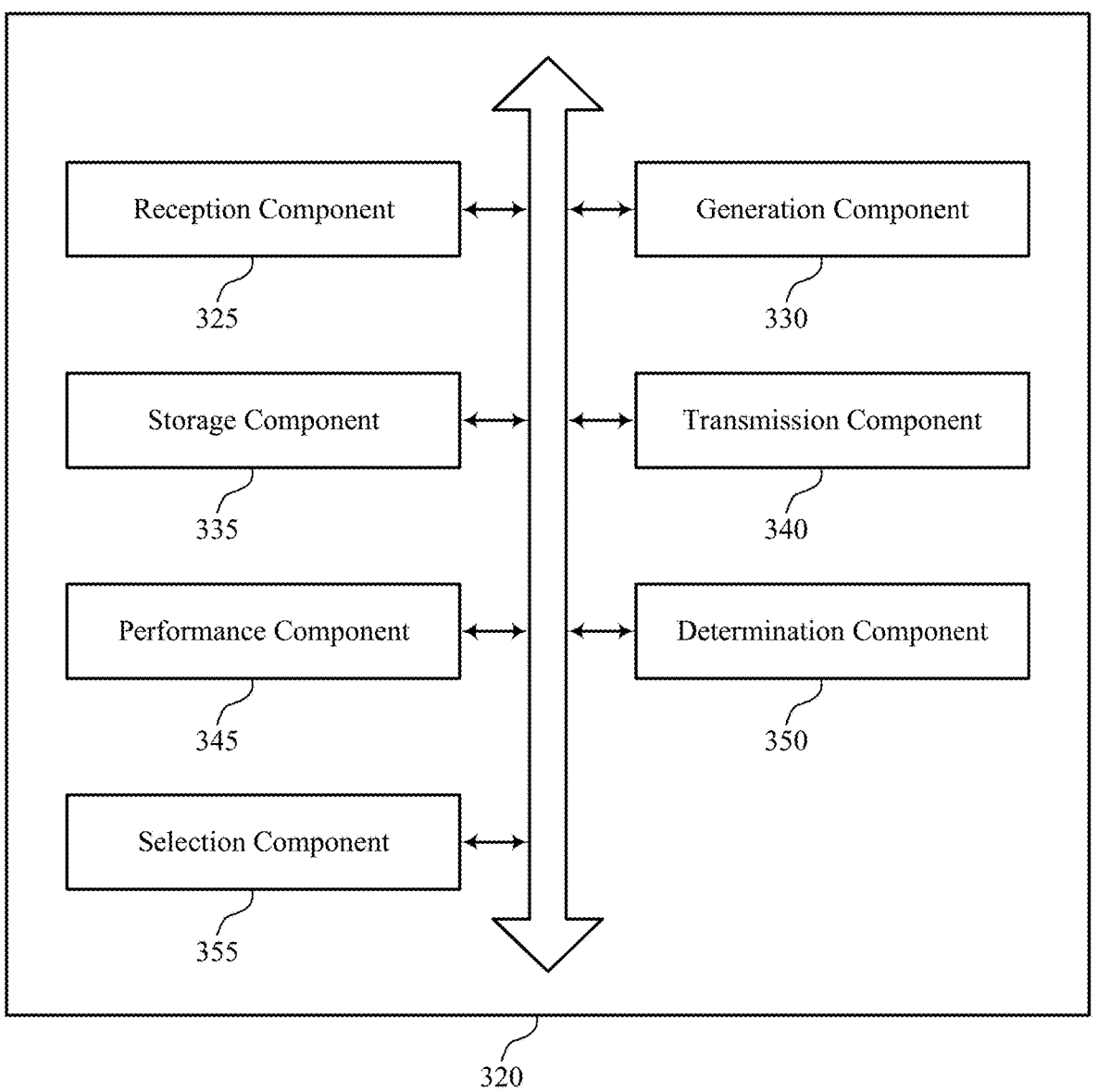
FIG. 3 shows a block diagram of a memory system that supports indicating data corruption in accordance with examples as disclosed herein.

FIG. 3 shows a block diagram 300 of a memory system 320 that supports indicating data corruption in accordance with examples as disclosed herein. The memory system 320 may be an example of aspects of a memory system as described with reference to FIGS. 1 through 2. The memory system 320, or various components thereof, may be an example of means for performing various aspects of indicating data corruption as described herein. For example, the memory system 320 may include a reception component 325, a generation component 330, a storage component 335, a transmission component 340, a performance component 345, a determination component 350, a selection component 355, or any combination thereof. Each of these components, or components of subcomponents thereof (e.g., one or more processors, one or more memories), may communicate, directly or indirectly, with one another (e.g., via one or more buses).

The reception component 325 may be configured as or otherwise support a means for receiving first data, first error control information associated with the first data, an address for storing the first data at a memory system, and a first indication that the first data is invalid. The generation component 330 may be configured as or otherwise support a means for generating second data and second error control information associated with the second data based at least in part on receiving the first indication, the second data including a pattern of bits indicating that data stored at the address is invalid. The storage component 335 may be configured as or otherwise support a means for storing the second data at the address based at least in part on generating the second data and the second error control information. The transmission component 340 may be configured as or otherwise support a means for transmitting the second data retrieved from the address and a second indication that the second data is invalid.

In some examples, the performance component 345 may be configured as or otherwise support a means for performing an error control operation on the second data, the error control operation using the second error control information. In some examples, the determination component 350 may be configured as or otherwise support a means for determining that the second data is invalid based at least in part on performing the error control operation, where transmitting the second indication is based at least in part on the determining.

In some examples, the reception component 325 may be configured as or otherwise support a means for receiving a command to read the address at the memory system. In some examples, the storage component 335 may be configured as or otherwise support a means for retrieving the second data from the address based at least in part on receiving the command, where the error control operation is performed on the second data based at least in part on retrieving the second data from the address, where transmitting the second indication is based at least in part on the retrieving.

In some examples, the generation component 330 may be configured as or otherwise support a means for generating the second indication that the second data is invalid based at least in part on determining the second data is invalid, where transmitting the second indication is based at least in part on generating the second indication.

In some examples, the reception component 325 may be configured as or otherwise support a means for receiving a plurality of data transmissions, each data transmission including data and respective error control information. In some examples, the reception component 325 may be configured as or otherwise support a means for receiving a plurality of addresses for storing the plurality of data transmissions. In some examples, the reception component 325 may be configured as or otherwise support a means for receiving a plurality of indications corresponding to the plurality of data transmissions, each indication indicating whether a respective data transmission is invalid, where receiving the first data, the first error control information, the address, and the first indication is based at least in part on receiving the plurality of data transmissions, the plurality of addresses, and the plurality of indications.

In some examples, the transmission component 340 may be configured as or otherwise support a means for transferring the plurality of data transmissions and the plurality of indications, via a cache, from a host system to the memory system, where receiving the plurality of data transmissions, the plurality of addresses, and the plurality of indications is based at least in part on transferring the plurality of data transmissions and the plurality of indications via the cache.

In some examples, the selection component 355 may be configured as or otherwise support a means for selecting the pattern of bits based at least in part on a plurality of error control codes, where the pattern of bits does not correspond to an error control code of the plurality of error control codes.

In some examples, the pattern of bits includes a quantity of bits with a same logic value.

In some examples, the pattern of bits includes a quantity of bits that fail to correct the second data during an error control operation.

In some examples, the address is located in a portion of the memory system dedicated for error information storage.

In some examples, the described functionality of the memory system 320, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 320, or various components thereof, may be implemented at least in part by instructions (e.g., stored in memory, non-transitory computer-readable medium) executable by such at least one processor.

FIG. 4 shows a flowchart illustrating a method 400 that supports indicating data corruption in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include receiving first data, first error control information associated with the first data, an address for storing the first data at a memory system, and a first indication that the first data is invalid. In some examples, aspects of the operations of 405 may be performed by a reception component 325 as described with reference to FIG. 3.

At 410, the method may include generating second data and second error control information associated with the second data based at least in part on receiving the first indication, the second data including a pattern of bits indicating that data stored at the address is invalid. In some examples, aspects of the operations of 410 may be performed by a generation component 330 as described with reference to FIG. 3.

At 415, the method may include storing the second data at the address based at least in part on generating the second data and the second error control information. In some examples, aspects of the operations of 415 may be performed by a storage component 335 as described with reference to FIG. 3.

At 420, the method may include transmitting the second data retrieved from the address and a second indication that the second data is invalid. In some examples, aspects of the operations of 420 may be performed by a transmission component 340 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving first data, first error control information associated with the first data, an address for storing the first data at a memory system, and a first indication that the first data is invalid; generating second data and second error control information associated with the second data based at least in part on receiving the first indication, the second data including a pattern of bits indicating that data stored at the address is invalid; storing the second data at the address based at least in part on generating the second data and the second error control information; and transmitting the second data retrieved from the address and a second indication that the second data is invalid.

Aspect 2: The method, apparatus, or non-transitory computer-readable medium of aspect 1, further including operations, features, circuitry, logic, means, or instructions, or any combination thereof for performing an error control operation on the second data, the error control operation using the second error control information and determining that the second data is invalid based at least in part on performing the error control operation, where transmitting the second indication is based at least in part on the determining.

Aspect 3: The method, apparatus, or non-transitory computer-readable medium of aspect 2, further including operations, features, circuitry, logic, means, or instructions, or any combination thereof for receiving a command to read the address at the memory system and retrieving the second data from the address based at least in part on receiving the command, where the error control operation is performed on the second data based at least in part on retrieving the second data from the address, where transmitting the second indication is based at least in part on the retrieving.

Aspect 4: The method, apparatus, or non-transitory computer-readable medium of any of aspects 2 through 3, further including operations, features, circuitry, logic, means, or instructions, or any combination thereof for generating the second indication that the second data is invalid based at least in part on determining the second data is invalid, where transmitting the second indication is based at least in part on generating the second indication.

Aspect 5: The method, apparatus, or non-transitory computer-readable medium of any of aspects 1 through 4, further including operations, features, circuitry, logic, means, or instructions, or any combination thereof for receiving a plurality of data transmissions, each data transmission including data and respective error control information; receiving a plurality of addresses for storing the plurality of data transmissions; and receiving a plurality of indications corresponding to the plurality of data transmissions, each indication indicating whether a respective data transmission is invalid, where receiving the first data, the first error control information, the address, and the first indication is based at least in part on receiving the plurality of data transmissions, the plurality of addresses, and the plurality of indications.

Aspect 6: The method, apparatus, or non-transitory computer-readable medium of aspect 5, further including operations, features, circuitry, logic, means, or instructions, or any combination thereof for transferring the plurality of data transmissions and the plurality of indications, via a cache, from a host system to the memory system, where receiving the plurality of data transmissions, the plurality of addresses, and the plurality of indications is based at least in part on transferring the plurality of data transmissions and the plurality of indications via the cache.

Aspect 7: The method, apparatus, or non-transitory computer-readable medium of any of aspects 1 through 6, further including operations, features, circuitry, logic, means, or instructions, or any combination thereof for selecting the pattern of bits based at least in part on a plurality of error control codes, where the pattern of bits does not correspond to an error control code of the plurality of error control codes.

Aspect 8: The method, apparatus, or non-transitory computer-readable medium of any of aspects 1 through 7, where the pattern of bits includes a quantity of bits with a same logic value.

Aspect 9: The method, apparatus, or non-transitory computer-readable medium of any of aspects 1 through 8, where the pattern of bits includes a quantity of bits that fail to correct the second data during an error control operation.

Aspect 10: The method, apparatus, or non-transitory computer-readable medium of any of aspects 1 through 9, where the address is located in a portion of the memory system dedicated for error information storage.

It should be noted that the aspects described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a memory array; and
processing circuitry coupled with the memory array and configured to cause the memory system to:
    receive a first data transmission, first error control information associated with the first data transmission, and an address for storing the first data transmission at the memory system;
    determine that the first data transmission is invalid;
    generate second data, and second error control information associated with the second data, based at least in part on the first data transmission being invalid, the second data comprising a pattern of bits indicative of invalid data;
    store the second data at the address based at least in part on generating the second data and the second error control information; and
    transmit the second data retrieved from the address and a second indication that the second data is invalid.

2. The memory system of claim 1, wherein the processing circuitry is further configured to cause the memory system to:
    perform an error control operation on the second data, the error control operation using the second error control information; and
    determine that the second data is invalid based at least in part on performing the error control operation, wherein transmitting the second indication is based at least in part on the determining.

3. The memory system of claim 2, wherein the processing circuitry is further configured to cause the memory system to:
    receive a command to read the address at the memory system; and
    retrieve the second data from the address based at least in part on receiving the command, wherein the error control operation is performed on the second data based at least in part on retrieving the second data from the address, wherein transmitting the second indication is based at least in part on the retrieving.

4. The memory system of claim 2, wherein the processing circuitry is further configured to cause the memory system to:
    generate the second indication that the second data is invalid based at least in part on determining the second data is invalid, wherein transmitting the second indication is based at least in part on generating the second indication.

5. The memory system of claim 1, wherein the processing circuitry is further configured to cause the memory system to:
    receive a plurality of data transmissions, each data transmission comprising data and respective error control information;
    receive a plurality of addresses for storing the plurality of data transmissions; and
    receive a plurality of indications corresponding to the plurality of data transmissions, each indication indicating whether a respective data transmission is invalid, wherein receiving the first data transmission, the first error control information, and the address is based at least in part on receiving the plurality of data transmissions, and the plurality of addresses.

6. The memory system of claim 5, wherein the processing circuitry is further configured to cause the memory system to:

transfer the plurality of data transmissions and the plurality of indications from a host system to the memory system, wherein receiving the plurality of data transmissions, the plurality of addresses, and the plurality of indications is based at least in part on transferring the plurality of data transmissions and the plurality of indications.

7. The memory system of claim 1, wherein the processing circuitry is further configured to cause the memory system to:

select the pattern of bits based at least in part on a plurality of error control codes, wherein the pattern of bits does not correspond to an error control code of the plurality of error control codes.

8. The memory system of claim 1, wherein the pattern of bits comprises a quantity of bits with a same logic value.

9. The memory system of claim 1, wherein the pattern of bits comprises a quantity of bits that fail to correct the second data during an error control operation.

10. A non-transitory computer-readable medium storing code, the code comprising instructions executable by one or more processors to:

receive a first data transmission, first error control information associated with the first data transmission, and an address for storing the first data transmission at a memory system;

determine that the first data transmission is invalid;

generate second data, and second error control information associated with the second data, based at least in part on the first data transmission being invalid, the second data comprising a pattern of bits indicative of invalid data;

store the second data at the address based at least in part on generating the second data and the second error control information; and transmit the second data retrieved from the address and a second indication that the second data is invalid.

11. The non-transitory computer-readable medium of claim 10, wherein the instructions are further executable by the one or more processors to:

perform an error control operation on the second data, the error control operation using the second error control information; and determine that the second data is invalid based at least in part on performing the error control operation, wherein transmitting the second indication is based at least in part on the determining.

12. The non-transitory computer-readable medium of claim 11, wherein the instructions are further executable by the one or more processors to:

receive a command to read the address at the memory system; and retrieve the second data from the address based at least in part on receiving the command, wherein the error control operation is performed on the second data based at least in part on retrieving the second data from the address, wherein transmitting the second indication is based at least in part on the retrieving.

13. The non-transitory computer-readable medium of claim 11, wherein the instructions are further executable by the one or more processors to:

generate the second indication that the second data is invalid based at least in part on determining the second data is invalid, wherein transmitting the second indication is based at least in part on generating the second indication.

14. The non-transitory computer-readable medium of claim 10, wherein the instructions are further executable by the one or more processors to:

receive a plurality of data transmissions, each data transmission comprising data and respective error control information;

receive a plurality of addresses for storing the plurality of data transmissions; and receive a plurality of indications corresponding to the plurality of data transmissions, each indication indicating whether a respective data transmission is invalid, wherein receiving the first data transmission, the first error control information, and the address is based at least in part on receiving the plurality of data transmissions, and the plurality of addresses.

15. The non-transitory computer-readable medium of claim 14, wherein the instructions are further executable by the one or more processors to:

transfer the plurality of data transmissions and the plurality of indications from a host system to the memory system, wherein receiving the plurality of data transmissions, the plurality of addresses, and the plurality of indications is based at least in part on transferring the plurality of data transmissions and the plurality of indications.

16. The non-transitory computer-readable medium of claim 10, wherein the instructions are further executable by the one or more processors to:

select the pattern of bits based at least in part on a plurality of error control codes, wherein the pattern of bits does not correspond to an error control code of the plurality of error control codes.

17. The non-transitory computer-readable medium of claim 10, wherein the pattern of bits comprises a quantity of bits with a same logic value.

18. The non-transitory computer-readable medium of claim 10, wherein the pattern of bits comprises a quantity of bits that fail to correct the second data during an error control operation.

19. A method by a memory system, comprising:

receiving a first data transmission, first error control information associated with the first data transmission, and an address for storing the first data transmission at the memory system;

determining that the first data transmission is invalid;

generating second data, and second error control information associated with the second data, based at least in part on the first data transmission being invalid, the second data comprising a pattern of bits indicative of invalid data;

storing the second data at the address based at least in part on generating the second data and the second error control information; and transmitting the second data retrieved from the address and a second indication that the second data is invalid.

20. The method of claim 19, further comprising:

performing an error control operation on the second data, the error control operation using the second error control information; and determining that the second data is invalid based at least in part on performing the error control operation, wherein transmitting the second indication is based at least in part on the determining.

21. The method of claim 20, further comprising:

receiving a command to read the address at the memory system; and retrieving the second data from the address based at least in part on receiving the command, wherein the error control operation is performed on the second data based at least in part on retrieving the second data from the address, wherein transmitting the second indication is based at least in part on the retrieving.

22. The method of claim 20, further comprising:

generating the second indication that the second data is invalid based at least in part on determining the second data is invalid, wherein transmitting the second indication is based at least in part on generating the second indication.

23. The method of claim 19, further comprising:

receiving a plurality of data transmissions, each data transmission comprising data and respective error control information;

receiving a plurality of addresses for storing the plurality of data transmissions; and receiving a plurality of indications corresponding to the plurality of data transmissions, each indication indicating whether a respective data transmission is invalid, wherein receiving the first data transmission, the first error control information, and the address is based at least in part on receiving the plurality of data transmissions, and the plurality of addresses.

24. The method of claim 23, further comprising:

transferring the plurality of data transmissions and the plurality of indications from a host system to the memory system, wherein receiving the plurality of data transmissions, the plurality of addresses, and the plurality of indications is based at least in part on transferring the plurality of data transmissions and the plurality of indications.

25. The method of claim 19, further comprising:

selecting the pattern of bits based at least in part on a plurality of error control codes, wherein the pattern of bits does not correspond to an error control code of the plurality of error control codes.

* * * * *